US012661740B2

(12) United States Patent
Shichi

(10) Patent No.: US 12,661,740 B2
(45) Date of Patent: Jun. 23, 2026

(54) LASER BEAM INTENSITY ADJUSTMENT METHOD AND LASER BEAM INTENSITY ADJUSTMENT APPARATUS

(71) Applicant: SHIMADZU CORPORATION, Kyoto (JP)

(72) Inventor: Hideharu Shichi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 765 days.

(21) Appl. No.: 18/013,147

(22) PCT Filed: Feb. 26, 2021

(86) PCT No.: PCT/JP2021/007284
§ 371 (c)(1),
(2) Date: Dec. 27, 2022

(87) PCT Pub. No.: WO2022/004051
PCT Pub. Date: Jan. 6, 2022

(65) Prior Publication Data
US 2023/0241713 A1 Aug. 3, 2023

(30) Foreign Application Priority Data
Jul. 2, 2020 (JP) ................................. 2020-114969

(51) Int. Cl.
*B23K 26/064* (2014.01)
*B23K 26/067* (2006.01)

(52) U.S. Cl.
CPC ........ *B23K 26/0648* (2013.01); *B23K 26/067* (2013.01)

(58) Field of Classification Search
CPC .............. B23K 26/0648; B23K 26/067; B23K 26/0626; B23K 26/064; G02B 26/02; G02B 27/28; G01N 27/64; G01N 27/62
See application file for complete search history.

(56) References Cited

U.S. PATENT DOCUMENTS

2007/0070484 A1* 3/2007 Nagano ................ G02B 27/283
                                                    359/328
2015/0146295 A1* 5/2015 Weng ................... G02B 27/283
                                                    359/489.08
2021/0257203 A1 8/2021 Shichi

FOREIGN PATENT DOCUMENTS

JP       2007-093643 A    4/2007
JP          3217378 U    8/2018
JP       2019-204766 A   11/2019

OTHER PUBLICATIONS

Japanese Office Action dated Oct. 31, 2023 in Japanese Application No. 2022-533675.

(Continued)

*Primary Examiner* — Brian W Jennison
(74) *Attorney, Agent, or Firm* — Sughrue Mion, PLLC

(57) ABSTRACT

An apparatus for emitting an incident laser beam that is a linearly polarized laser beam at a predetermined intensity, includes: an intensity changing optical element (polarization beam splitter) disposed on the optical path of the incident laser beam, for changing the intensity of an outgoing laser beam by allowing a transmission of a component of the incident laser beam polarized in a predetermined variable transmission direction and to rotate around the optical axis of the incident laser beam within a range of at least 90° with respect to a predetermined reference angle; and a polarization direction changing optical element (concave lens) disposed upstream the optical path of the incident laser beam with respect to the intensity changing optical element, and for changing the polarization direction of the incident laser beam and to emit the incident laser beam, the change direction being variable.

7 Claims, 3 Drawing Sheets

(56)         References Cited

OTHER PUBLICATIONS

Written Opinion for PCT/JP2021/007284 dated May 18, 2021.
International Search Report for PCT/JP2021/007284 dated May 18,
2021.
Communication dated Jan. 20, 2026, issued in Chinese Application
No. 202180042194.X.

\* cited by examiner

POLARIZATION BEAM SPLITTER ROTATION ANGLE θ (°)

POLARIZATION BEAM SPLITTER ROTATION ANGLE θ (°)

LASER BEAM INTENSITY ADJUSTMENT METHOD AND LASER BEAM INTENSITY ADJUSTMENT APPARATUS

This Application is a National Stage of International Application No. PCT/JP2021/007284 filed Feb. 26, 2021, claiming priority based on Japanese Patent Application No. 2020-114969 filed Jul. 2, 2020.

TECHNICAL FIELD

The present invention relates to a method and an apparatus for adjusting the intensity of a laser beam.

BACKGROUND ART

Conventionally, a matrix assisted laser desorption ionization (MALDI) method has been used as one of the methods for ionizing an object to be measured in mass spectrometry. In the MALDI method, a sample prepared by mixing the object to be measured and a matrix is irradiated with a laser beam for a short time to vaporize the substance to be measured and ionize molecules constituting the object to be measured almost at the same time. In this way, by previously mixing the object to be measured and the matrix, and appropriately adjusting the intensity of the laser beam, it is possible to ionize the molecules while preventing them from being destroyed during laser beam irradiation.

Patent Literature 1 describes an apparatus in the MALDI method for adjusting the intensity of the laser beam irradiating the sample. This laser beam intensity adjustment apparatus includes a laser light source that emits a linearly polarized laser beam and an "energy adjustment member" which transmits the laser beam at a different transmittance depending on the polarization direction of the transmitted laser beam. Specifically, a polarization beam splitter is used as the "energy adjustment member". The polarization beam splitter allows transmission of a component of the incident linearly polarized light parallel to a predetermined direction (transmission direction), and reflects a component perpendicular to the predetermined direction. In the laser beam intensity adjustment apparatus of Patent Literature 1, the polarization beam splitter is provided in such a manner that the transmission direction is rotatable around the optical axis of the laser beam emitted from the laser light source. As the transmission direction rotates around the optical axis, the intensity of the polarized light transmitted through the polarization beam splitter changes in such a way that the intensity becomes the maximum value when the transmission direction and the polarization direction of the incident linearly polarized light coincide, and becomes 0 from the maximum value when the polarization beam splitter is rotated by 90°. Therefore, with the polarization beam splitter disposed such that the sample is irradiated with the light having transmitted through the polarization beam splitter, the intensity of the laser beam irradiating the sample can be adjusted within a range from a predetermined maximum value to 0 by rotating the polarization beam splitter with respect to a reference angle within a range of 90°, where the reference angle is set as the polarization direction of the laser beam emitted from the laser light source and the transmission direction of the polarization beam splitter coincide.

CITATION LIST

Patent Literature

Patent Literature 1: JP 3217378 U

SUMMARY OF INVENTION

Technical Problem

In the MALDI method, conventionally, on an optical path of a laser beam irradiating a sample, a concave lens is disposed just in front of a laser light source to expand the diameter of the laser beam, and a convex lens is disposed just before the sample to condense the expanded laser beam. As a result, it is possible to ensure safety by lowering the energy density between the concave lens and the convex lens, and to irradiate the sample with the laser beam at a high energy density by condensing the beam with the convex lens. The inventor of the present application has found that, in such an arrangement when a polarization beam splitter is disposed between the concave lens and the convex lens, the transmission direction of the polarization beam splitter is rotated within a range of 90° with respect to a reference angle, and the intensity of the laser beam irradiating the sample is measured, either the maximum value of the intensity does not reach a predetermined value or the minimum value does not reach 0. This creates a problem that the range in which the intensity of the laser beam irradiating the sample is changed is narrowed, and the sample cannot be ionized properly.

In addition, if the intensity adjustment range of the laser beam irradiating the sample may be intentionally narrowed, it becomes easier to finely adjust the intensity. However, in the apparatus of Patent Literature 1, it is impossible to change the adjustment range to be narrower.

A problem to be solved by the present invention is to provide a method for making it possible to change the intensity adjustment range of the laser beam and a laser beam intensity adjustment apparatus using the method.

Solution to Problem

A laser beam intensity adjustment method according to the present invention developed to solve the above problem is a method for emitting an incident laser beam that is a linearly polarized laser beam at a predetermined intensity, the method including steps of:

disposing an intensity changing optical element on the optical path of the incident laser beam, the intensity changing optical element being configured to change the intensity of an outgoing laser beam by allowing a transmission of a component of the incident laser beam polarized in a predetermined transmission direction and to rotate around the optical axis of the incident laser beam within a range of at least 90° with respect to a predetermined reference angle, the transmission direction being variable;

disposing a polarization direction changing optical element upstream the optical path of the incident laser beam with respect to the intensity changing optical element, the polarization direction changing optical element being configured to change the polarization direction of the incident laser beam and to emit the incident laser beam, the change direction (direction in which the polarization direction is changed) being variable; and adjusting the change direction such that the polarization direction of the incident laser beam emitted from the polarization direction changing optical element coincides with the transmission direction of a time when the rotation angle of the intensity changing optical element is at the reference angle.

A laser beam intensity adjustment apparatus according to the present invention is an apparatus for emitting an incident laser beam that is a linearly polarized laser beam at a predetermined intensity, the laser beam intensity adjustment apparatus including:

an intensity changing optical element disposed on the optical path of the incident laser beam, configured to change an intensity of an outgoing laser beam by allowing a transmission of a component of the incident laser beam polarized in a predetermined transmission direction, and configured to rotate around the optical axis of the incident laser beam within a range of at least 90° with respect to a predetermined reference angle, the transmission direction being variable; and a polarization direction changing optical element disposed upstream the optical path of the incident laser beam with respect to the intensity changing optical element, and configured to change the polarization direction of the incident laser beam and to emit the incident laser beam, the change direction being variable.

Advantageous Effects of Invention

The inventor of the present application has found that an optical element, such as a lens, may have a characteristic of changing a polarization direction of an incident laser beam (without changing the intensity) and emitting the incident laser beam, and further by rotating such an optical element around the optical axis of the incident laser beam, the polarization change direction may change (without changing the intensity). In the present description, the optical element that changes the polarization direction of the incident laser beam and emits the incident laser beam and in which the change direction is variable is referred to as polarization direction changing optical element. On the other hand, an intensity changing optical element changes the intensity of the outgoing laser beam by transmitting a component having a predetermined transmission direction among the polarized light whose direction has been changed by the polarization direction changing optical element, and further, the transmission direction is variable. By combining the polarization direction changing optical element and the intensity changing optical element, since the polarization direction of the incident laser beam is changed by the polarization direction changing optical element, it is possible to change the range in which the intensity of the outgoing laser beam is changed while the transmission direction of the intensity changing optical element is changed within a predetermined range, that is, it is possible to change the intensity adjustment range of the laser beam.

DESCRIPTION OF EMBODIMENTS

Embodiments of a laser beam intensity adjustment method and an apparatus according to the present invention will be described with reference to FIGS. 1 to 6.

Figure 1:
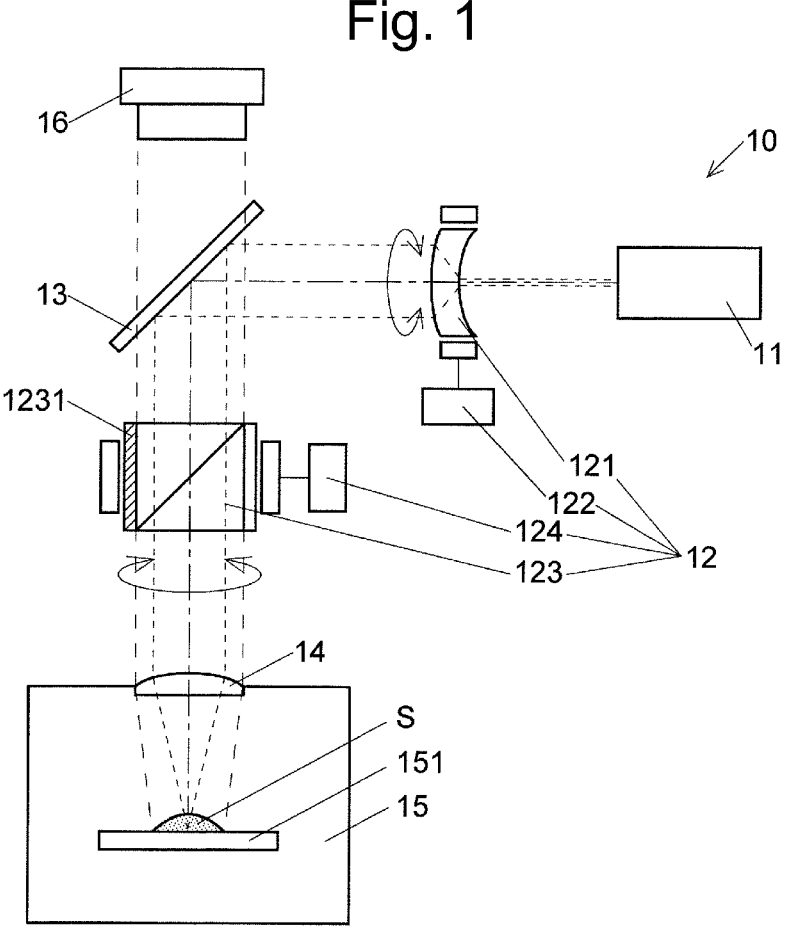
FIG. 1 is a schematic view illustrating an example of a MALDI ion source that includes an embodiment of a laser beam intensity adjustment apparatus according to the present invention.
Figure 2:
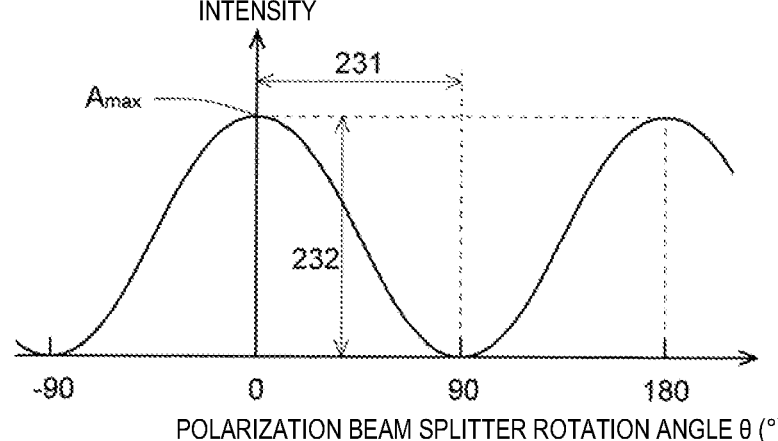
FIG. 2 is a graph illustrating the relationship between a rotation angle of a polarization beam splitter and an intensity of a laser beam transmitted through the polarization beam splitter in a case where a polarization direction of an incident laser beam and a transmission direction of the polarization beam splitter (intensity changing optical element) coincide in the laser beam intensity adjustment apparatus of the present embodiment.

FIG. 1 is a schematic diagram illustrating a MALDI ion source 10 including a laser beam intensity adjustment apparatus 12 which is an embodiment according to the present invention. The MALDI ion source 10 includes a laser light source 11, a concave lens (polarization direction changing optical element) 121, a concave lens rotation mechanism 122, a mirror 13, a polarization beam splitter (intensity changing optical element) 123, a polarization beam splitter rotation mechanism 124, a convex lens 14, a sample chamber 15, and a camera 16. Out of those components, the concave lens 121, the concave lens rotation mechanism 122, the polarization beam splitter 123, and the polarization beam splitter rotation mechanism 124 constitute the laser beam intensity adjustment apparatus 12.

The laser light source 11 is a light source that oscillates a linearly polarized laser beam. In the present embodiment, an ultraviolet laser having an oscillation wavelength of 349 nm is used for the laser light source 11, but the wavelength of the laser beam is not particularly limited in the present invention.

The concave lens 121 is made of synthetic fused silica, which is a material that easily transmits ultraviolet light, and is disposed on an optical path of the laser beam emitted from the laser light source 11. The concave lens 121 includes a concave surface on the incident side and a convex surface on the outgoing side having a curvature smaller than the concave surface on the incident side, forming a concave shape as a whole. This shape expands the diameter of the laser beam incident on the concave lens 121 and makes it a parallel beam. The purpose of using the concave lens 121 is to ensure safety by expanding the diameter of the laser beam to lower the energy density between the concave lens 121 and the convex lens 14, and also to irradiate a sample S with the laser beam at a high energy density by condensing the beam with the convex lens 14 as described below.

As described above, the original purpose of the concave lens 121 is to expand the diameter of the laser beam, but the inventor of the present application has found that the concave lens 121 also has a characteristic of changing the polarization direction when the linearly polarized laser beam passes through and simultaneously changing the change direction by being rotated around the optical axis of the incident laser beam. In other words, the concave lens 121 corresponds to a polarization direction changing optical element.

The concave lens rotation mechanism 122 is a device that rotates the concave lens 121 around the optical axis of the laser beam (indicated by the long dashed short dashed line in FIG. 1). The concave lens rotation mechanism 122 may rotate the concave lens 121 by power from a motor or other power sources, or the concave lens rotation mechanism 122 itself may not have power but hold the concave lens 121 in a rotatable manner such that the concave lens 121 can be manually rotated. In addition, the concave lens rotation mechanism 122 may be provided with a stopper to fix the concave lens 121 for not rotating the concave lens.

The mirror 13 is disposed on the optical path of the laser beam having passed through the concave lens 121, with the reflecting surface at 45° to the incident angle, and reflects ultraviolet light within a specific wavelength band including the wavelength of the laser beam in a 90° direction. Light with wavelengths not included in the wavelength band is transmitted through the mirror 13. Visible light is not included in the wavelength band.

The polarization beam splitter 123 is disposed on the optical path of the laser beam reflected by the mirror 13 and transmits the laser beam when the polarization direction of the laser beam incident on the polarization beam splitter 123 coincides with a predetermined transmission direction, and reflects all the laser beam in a 90° direction when the polarization direction is perpendicular to the transmission direction. More generally speaking, if the angle of the transmission direction with respect to the polarization direction of the laser beam (intensity $A_{max}$) incident on the polarization beam splitter 123 is $\theta$, then the intensity of the laser beam having passed through the polarization beam splitter 123 is $A_{max} \cos \theta$ (see FIG. 2). The visible light captured by the camera 16 to be described later is transmitted through the polarization beam splitter 123 without being reflected.

The polarization beam splitter rotation mechanism 124 is a device that rotates the polarization beam splitter 123 around the optical axis of the laser beam. In the configuration, the polarization beam splitter rotation mechanism 124 may rotate the polarization beam splitter 123 by power from a motor or other power sources, or the polarization beam splitter rotation mechanism 124 itself may not have power but hold the polarization beam splitter 123 in a rotatable manner such that the polarization beam splitter 123 can be manually rotated.

Around the polarization beam splitter 123 is provided a shielding unit 1231 that shields the laser beam reflected in the 90° direction by the polarization beam splitter 123 such that the laser beam is not emitted to the outside.

The convex lens 14 is provided on the optical path of the laser beam having passed through the polarization beam splitter 123 and on a wall surface of the sample chamber 15. The sample chamber 15 is provided for a mass spectrometer that executes the MALDI method. Inside the sample chamber 15 is provided a sample holding unit 151, which holds the sample S in which a substance to be measured and a matrix are mixed. The convex lens 14 is designed to condense the laser beam onto the sample S held on a sample holding unit 151.

The camera 16 is disposed in a position facing the convex lens 14 with the polarization beam splitter 123 and the mirror 13 interposed between them, and shoots the inside of the sample chamber 15 with visible light incident from the sample chamber 15 passing through the polarization beam splitter 123 and the mirror 13. The camera 16 is designed to adjust the laser beam irradiation position and the sample position based on the images captured by the camera 16. Since the adjustment of the irradiation position and the sample position is not directly related to the present invention, a detailed description of this adjustment is omitted.

Next, an operation of the MALDI ion source 10 including the laser beam intensity adjustment apparatus 12 of the present embodiment and the laser beam intensity adjustment method according to the present invention will be described.

First, the polarization beam splitter rotation mechanism 124 rotates the polarization beam splitter 123 such that a transmission direction 21 (FIG. 3) turns to a predetermined reference angle. Here, the reference angle is usually determined as such that the transmission direction 21 and a polarization direction 221 coincide when the laser beam emitted from the laser light source 11 is incident on the polarization beam splitter 123 without any change in the polarization direction 221. If the polarization direction 221 of the incident laser beam does not change from the polarization direction at the time of emission from the laser light source 11, the intensity of the laser beam having passed through the polarization beam splitter 123 depends on the rotation angle $\theta$ with respect to the reference angle and becomes $A_{max} \cos \theta$ ($A_{max}$ is a constant). Therefore, when the polarization beam splitter 123 is rotated 90° with respect to the reference angle (rotation range 231 in FIG. 2), the intensity adjustment range 232 of the laser beam is from the maximum value $A_{max}$ to the minimum value 0.

Figure 3:
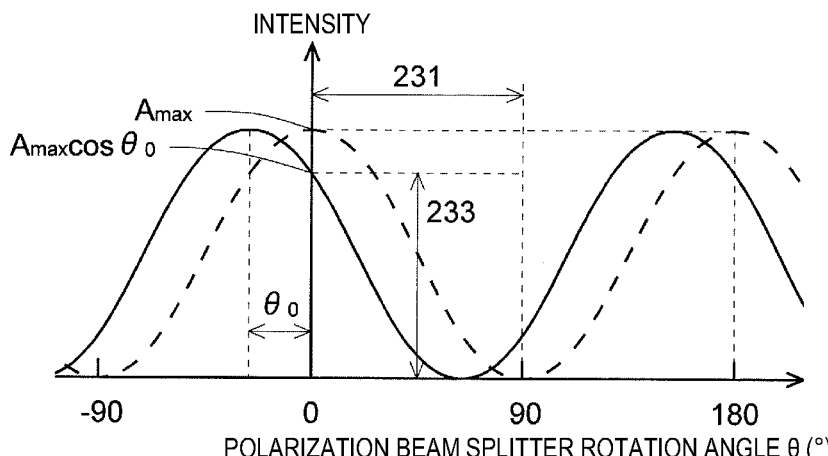
FIG. 3 is a diagram schematically illustrating the polarization direction of the laser beam incident on the polarization beam splitter and the transmission direction of the polarization beam splitter in the laser beam intensity adjustment apparatus of the present embodiment.
Figure 4:
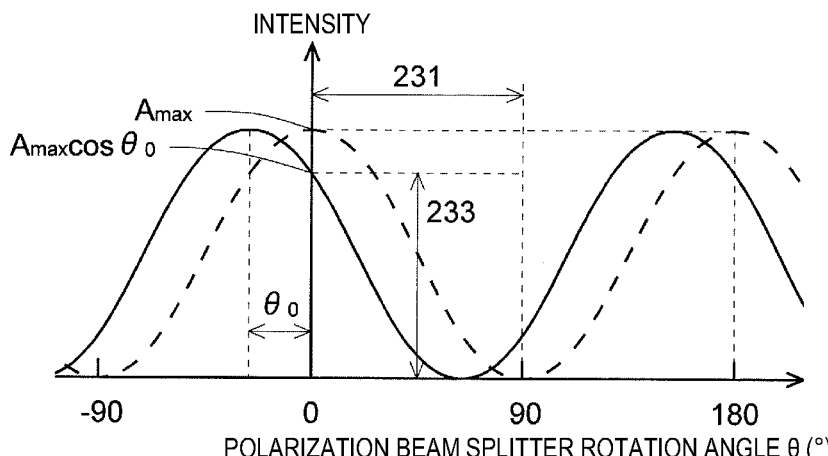
FIG. 4 is a graph illustrating the relationship between the rotation angle of the polarization beam splitter and the intensity of the laser beam transmitted through the polarization beam splitter in a case where the polarization direction of the incident laser beam and the transmission direction of the polarization beam splitter are slightly different by an angle $\theta_0$ in the laser beam intensity adjustment apparatus of the present embodiment.

However, in practice, the polarization direction of the laser beam emitted from the laser light source 11 is changed by passing through the concave lens 121. Here, an angle formed by the unchanged polarization direction 221 and the polarization direction 222 changed from that direction is $\theta_0$ (FIG. 3). If the polarization beam splitter 123 is rotated 90° with respect to the reference angle in this condition, the maximum intensity of the laser beam having passed through the polarization beam splitter 123 during the rotation is only $A_{max} \cos \theta_0$ ($<A_{max}$). Then, the intensity adjustment range 233 of the laser beam when the polarization beam splitter 123 is rotated 90° with respect to the reference angle is a range from the maximum value $A_{max} \cos \theta_0$ ($<A_{max}$) to the minimum value 0 (FIG. 4), and becomes narrower than the intensity adjustment range 232 when the polarization direction 221 is unchanged from the polarization direction at the time of emission from the laser light source 11.

Figure 5:
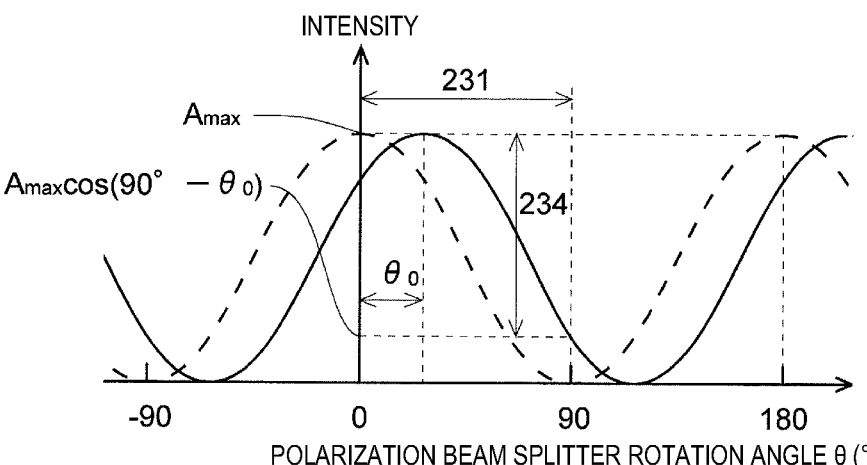
FIG. 5 is a graph illustrating the relationship between the rotation angle of the polarization beam splitter and the intensity of the laser beam transmitted through the polarization beam splitter in a case where the polarization direction of the incident laser beam and the transmission direction of the polarization beam splitter are slightly different by an angle $-\theta_0$ in the laser beam intensity adjustment apparatus of the present embodiment.

Similarly, when the angle formed by the unchanged polarization direction 221 and the polarization direction 222 changed from that direction is $-\theta_0$ (the polarization direction is shifted to the opposite direction from the above example), the intensity adjustment range 234 of the laser beam when the polarization beam splitter 123 is rotated 90° with respect to the reference angle has a maximum value of $A_{max}$ and a minimum value of $A_{max} \cos(90° - \theta_0)$ ($>0$) (FIG. 5). Also in this case, the adjustment range 234 is narrower than the intensity adjustment range 232 when the polarization direction 221 is unchanged from the polarization direction at the time of emission from the laser light source 11.

Therefore, the concave lens rotation mechanism 122 rotates the concave lens 121 to change the polarization direction of the laser beam having passed through the concave lens 121 such that the polarization direction coincides with the transmission direction 21 of the polarization beam splitter 123. As a result, in a case where the polarization beam splitter 123 is rotated 90° with respect to the reference angle, the intensity adjustment range of the laser beam is a range from the maximum value of $A_{max}$ to the minimum value of 0, which is the maximum size of the adjustment range.

After the intensity adjustment range of the laser beam is set as described above, the polarization beam splitter rotation mechanism 124 rotates the polarization beam splitter 123 within a range of 90° with respect to the reference angle to adjust the intensity of the laser beam irradiated to the sample S within the adjustment range described above. Therefore, it is possible to appropriately set the intensity of the laser beam irradiated when ionizing the sample S in the mass spectrometer.

Figure 6:
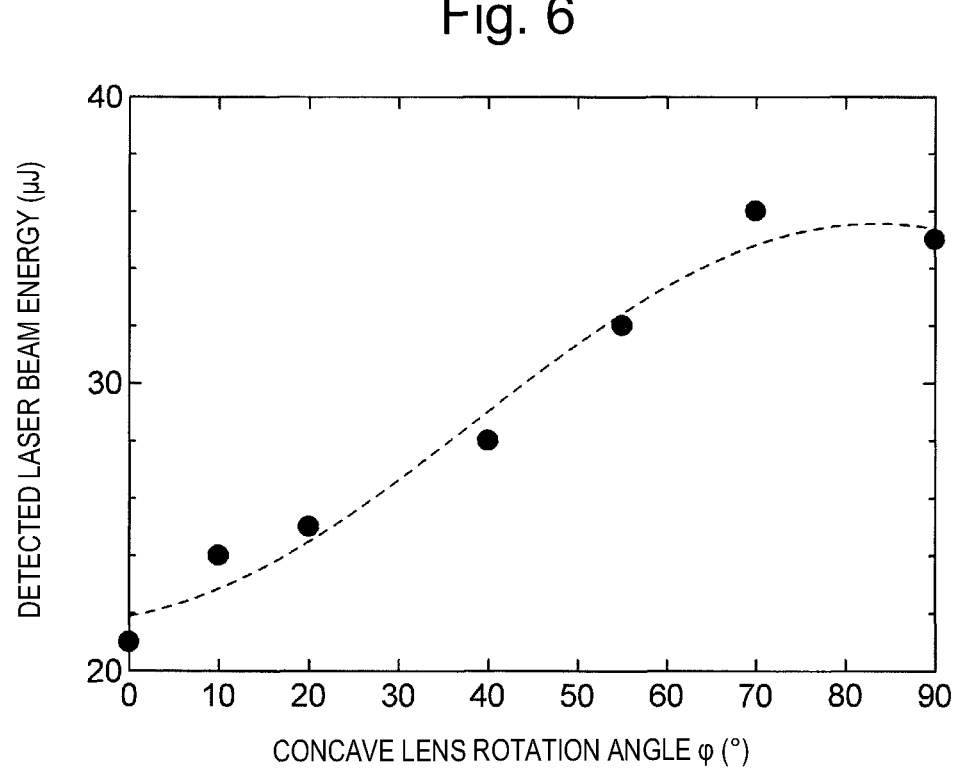
FIG. 6 is a graph illustrating the results of experiments on the relationship between the rotation angle of a concave lens and the energy of the laser beam transmitted through the polarization beam splitter under the condition that the polarization beam splitter is fixed in the laser beam intensity adjustment apparatus of the present embodiment.

In order to confirm that the direction of the linearly polarized laser beam passing through the concave lens 121 is changed by rotating the concave lens 121 around the optical axis of the laser beam, an experiment is conducted to measure the energy (corresponding to the intensity) of the laser beam having transmitted through the polarization beam splitter 123 while rotating the concave lens 121 with the polarization beam splitter 123 fixed. The results of this experiment are shown in the graph of FIG. 6. The horizontal axis of this graph indicates the rotation angle φ of the concave lens 121 (different from the rotation angle θ of the polarization beam splitter 123). One arbitrary rotation position is defined as a reference angle of φ (φ=0°). As shown in FIG. 6, although the polarization beam splitter 123 is fixed, the energy of the laser beam having transmitted through the polarization beam splitter 123 changes as the rotation angle φ of the concave lens 121 changes. This means that the direction of the linearly polarized laser beam passing through the concave lens 121 changes. From the experimental results, it is considered that at a rotation angle $φ_a$ near 90°, the energy of the laser beam is at the maximum, and the direction of the linearly polarized laser beam passing through the concave lens 121 and the transmission direction of the polarization beam splitter 123 coincide. Therefore, when the polarization beam splitter 123 is rotated with the concave lens 121 fixed at this rotation angle $φ_a$, the energy (intensity) adjustment range of the laser beam can be maximized.

Modified Examples

The present invention is not limited to the above embodiment. For example, in the above embodiment, the rotation angle of the concave lens 121 is adjusted such that the intensity adjustment range of the laser beam is maximized, but to make it easier to finely adjust the intensity, the rotation angle may be adjusted to intentionally narrow the intensity adjustment range of the laser beam.

In the above embodiment, the concave lens is used as the polarization direction changing optical element, but the shape of the concave lens is not limited to the shape described above. Also, instead of the concave lens, a convex lens may be disposed upstream with respect to the intensity changing optical element as the polarization direction changing optical element. Furthermore, optical elements other than the lens, such as a bandpass filter that passes only a laser beam within a specific wavelength band, have characteristics as the polarization direction changing optical element, and these optical elements may be used in the present invention.

In the above embodiment, the polarization beam splitter is used as the intensity changing optical element, but a polarization plate or the like may be used instead.

In the above embodiment, a case of adjusting the intensity of the laser beam irradiated to ionize the sample in the mass spectrometer is described as an example, but the application of the present invention is not limited to that, and the present invention can also be applied to, for example, a case of processing such as cutting or welding using the laser beam.

Modes

It will be understood by those skilled in the art that the exemplary embodiments described above are specific examples of the following modes.
(Clause 1)

A laser beam intensity adjustment method according to clause 1 is a method for emitting an incident laser beam that is a linearly polarized laser beam at a predetermined intensity, the method including steps of:

disposing an intensity changing optical element on an optical path of the incident laser beam, the intensity changing optical element being configured to change an intensity of an outgoing laser beam by allowing a transmission of a component of the incident laser beam polarized in a predetermined transmission direction and to rotate around an optical axis of the incident laser beam within a range of at least 90° with respect to a predetermined reference angle, the transmission direction being variable;

disposing a polarization direction changing optical element upstream the optical path of the incident laser beam with respect to the intensity changing optical element, the polarization direction changing optical element being configured to change a polarization direction of the incident laser beam and to emit the incident laser beam, the change direction (direction in which the polarization direction is changed) being variable; and adjusting the change direction such that the polarization direction of the incident laser beam emitted from the polarization direction changing optical element coincides with the transmission direction of a time when a rotation angle of the intensity changing optical element is at the reference angle.
(Clause 4)

A laser beam intensity adjustment apparatus according to clause 4 is an apparatus for emitting an incident laser beam that is a linearly polarized laser beam at a predetermined intensity, the laser beam intensity adjustment apparatus including:

an intensity changing optical element disposed on an optical path of the incident laser beam, configured to change an intensity of an outgoing laser beam by allowing a transmission of a component of the incident laser beam polarized in a predetermined transmission direction, and configured to rotate around an optical axis of the incident laser beam within a range of at least 90° with respect to a predetermined reference angle, the transmission direction being variable; and a polarization direction changing optical element disposed upstream the optical path of the incident laser beam with respect to the intensity changing optical element, and configured to change a polarization direction of the incident laser beam and to emit the incident laser beam, the change direction being variable.

According to the laser beam intensity adjustment method according to clause 1 and the laser beam intensity adjustment apparatus according to clause 4, since the polarization direction of the incident laser beam is changed by the polarization direction changing optical element, the range in which the intensity of the outgoing laser beam can be changed while the transmission direction of the intensity changing optical element is changed within a predetermined range, that is, the intensity adjustment range of the laser beam can be changed.

At that time, by adjusting the change direction of the polarization direction with the polarization direction changing optical element such that the polarized light of the laser beam emitted from the polarization direction changing optical element and incident on the intensity changing optical element coincides with the transmission direction of a time when the rotation angle of the intensity changing optical element is at the reference angle, the intensity of the laser beam changes from the maximum value to 0 as the intensity changing optical element is rotated by 90° with respect to the predetermined reference angle. As a result, the intensity adjustment range can be set to the maximum range that can be obtained by the intensity changing optical element.

A polarization beam splitter or a polarizer, for example, may be used as the intensity changing optical element. An optical lens such as a concave lens or a bandpass filter that allows only the laser beam within a specific wavelength band to pass through, for example, may be used as the polarization direction changing optical element.

(Clause 2)

A laser beam intensity adjustment method according to clause 2 is the laser beam intensity adjustment method according to clause 1, wherein the polarization direction changing optical element is a concave lens.

(Clause 5)

A laser beam intensity adjustment apparatus according to clause 5 is the laser beam intensity adjustment apparatus according to clause 4, wherein the polarization direction changing optical element is a concave lens.

According to the laser beam intensity adjustment method according to clause 2 and the laser beam intensity adjustment apparatus according to clause 5, safety can be ensured by lowering the energy density of the laser beam between the polarization direction changing optical element and the intensity changing optical element.

When the concave lens is used as the polarization direction changing optical element, a convex lens is provided between the intensity changing optical element and the object to be irradiated with the laser beam, so that the energy density of the laser beam irradiated to the object to be irradiated can be increased. Unlike the polarization direction changing optical element, the rotation angle of the convex lens, provided between the intensity changing optical element and the object to be irradiated, with respect to the optical axis of the laser beam does not affect the direction of the linearly polarized light incident on the intensity changing optical element, and thus does not affect the intensity adjustment range.

(Clause 3)

A laser beam intensity adjustment method according to clause 3 is the laser beam intensity adjustment method according to clause 1 or 2, wherein the intensity changing optical element is a polarization beam splitter.

(Clause 6)

A laser beam intensity adjustment apparatus according to clause 6 is the laser beam intensity adjustment apparatus according to clause 4 or 5, wherein the intensity changing optical element is a polarization beam splitter.

According to the laser beam intensity adjustment method according to clause 3 and the laser beam intensity adjustment apparatus according to clause 6, the laser beam incident on the polarization beam splitter that is not allowed to pass through due to the intensity adjustment is reflected, which prevents the intensity changing optical element (polarization beam splitter) from absorbing the energy of the laser beam, so that the heating of the intensity changing optical element can be suppressed.

(Clause 7)

A mass spectrometer according to clause 7 includes:

a laser beam intensity adjustment apparatus according to any one of clauses 4 to 6; and a sample holding unit disposed on an optical path of the laser beam transmitted through the intensity changing optical element, and configured to hold a sample to be analyzed.

According to the mass spectrometer according to clause 7, the intensity of the laser beam irradiated when ionizing the sample in the mass spectrometer can be appropriately set.

REFERENCE SIGNS LIST

10 . . . MALDI Ion Source
11 . . . Laser Light Source
12 . . . Laser Beam Intensity Adjustment Apparatus
121 . . . Concave Lens (Polarization Direction Changing Optical Element)
122 . . . Concave Lens Rotation Mechanism
123 . . . Polarization Beam Splitter (Intensity Changing Optical Element)
1231 . . . Shielding Unit
124 . . . Polarization Beam Splitter Rotation Mechanism
13 . . . Mirror
14 . . . Convex Lens
15 . . . Sample Chamber
151 . . . Sample Holding Unit
16 . . . Camera
21 . . . Transmission Direction of Polarization Beam Splitter
221, 222 . . . Polarization Direction of Laser Beam
231 . . . Rotation Range of Polarization Beam Splitter
232, 233, 234 . . . Intensity Adjustment Range of Laser Beam

The invention claimed is:

1. A laser beam intensity adjustment method for emitting an incident laser beam that is a linearly polarized laser beam at a predetermined intensity, the laser beam intensity adjustment method comprising steps of:

disposing an intensity changing optical element on an optical path of the incident laser beam, the intensity changing optical element being configured to change an intensity of an outgoing laser beam by allowing a transmission of a component of the incident laser beam polarized in a predetermined transmission direction and to rotate around an optical axis of the incident laser beam within a range of at least 90° with respect to a predetermined reference angle, the transmission direction being variable;

disposing a polarization direction changing optical element upstream the optical path of the incident laser beam with respect to the intensity changing optical element, the polarization direction changing optical element being configured to change a polarization direction of the incident laser beam and to emit the incident laser beam; and rotating the polarization direction changing optical element such that the polarization direction of the incident laser beam emitted from the polarization direction changing optical element coincides with the transmission direction when a rotation angle of the intensity changing optical element is at the predetermined reference angle, wherein the predetermined reference angle is an angle at which the polarization direction of the incident laser beam coincides with the transmission direction of the intensity changing optical element when the incident laser beam enters the intensity changing optical element without passing through the polarization direction changing optical element.

2. The laser beam intensity adjustment method according to claim 1, wherein the polarization direction changing optical element is a concave lens.

3. The laser beam intensity adjustment method according to claim 1, wherein the intensity changing optical element is a polarization beam splitter.

4. A laser beam intensity adjustment apparatus for emitting an incident laser beam that is a linearly polarized laser beam at a predetermined intensity, the laser beam intensity adjustment apparatus comprising:

an intensity changing optical element disposed on an optical path of the incident laser beam, configured to change an intensity of an outgoing laser beam by allowing a transmission of a component of the incident laser beam polarized in a predetermined transmission direction, and configured to rotate around an optical axis of the incident laser beam within a range of at least 90° with respect to a predetermined reference angle, the transmission direction being variable;

a polarization direction changing optical element disposed upstream the optical path of the incident laser beam with respect to the intensity changing optical element, and configured to change a polarization direction of the incident laser beam and to emit the incident laser beam; and a polarization direction changing optical element rotation mechanism configured to rotate the polarization direction changing optical element such that the polarization direction of the incident laser beam emitted from the polarization direction changing optical element coincides with the transmission direction when a rotation angle of the intensity changing optical element is at the predetermined reference angle;

wherein the predetermined reference angle is an angle at which the polarization direction of the incident laser beam coincides with the transmission direction of the intensity changing optical element when the incident laser beam enters the intensity changing optical element without passing through the polarization direction changing optical element.

5. The laser beam intensity adjustment apparatus according to claim 4, wherein the polarization direction changing optical element is a concave lens.

6. The laser beam intensity adjustment apparatus according to claim 4, wherein the intensity changing optical element is a polarization beam splitter.

7. A mass spectrometer, comprising:

the laser beam intensity adjustment apparatus according to claim 4; and a sample holding unit disposed on an optical path of the laser beam transmitted through the intensity changing optical element, and configured to hold a sample to be analyzed.

*    *    *    *    *